Patented June 15, 1926.

1,588,405

UNITED STATES PATENT OFFICE.

FRANK CURTIS GEPHART, OF NEW YORK, N. Y., ASSIGNOR TO COCOA PRODUCTS COMPANY OF AMERICA INCORPORATED, OF LONG ISLAND CITY, NEW YORK, A CORPORATION OF DELAWARE.

PROCESS OF REFINING OILS AND FATS.

No Drawing.    Application filed May 11, 1923. Serial No. 638,404.

This invention relates to a process of refining oils and fats for the purpose of making them edible or suitable for other purposes for which a high degree of refinement is necessary. The process is especially suitable for the treatment of cocoa butter although it may be used in refining other fats and oils.

Cocoa butter is used in large quantities as an ingredient of food and other products. Heretofore the only grade of cocoa butter which has been available as a constituent of foods is the product obtained by subjecting the crushed cocoa bean to pressure. The press cake resulting from this treatment consists of cocoa powder with a large proportion of fats, but these fats can be separated from the powder only by the use of a solvent, such as benzol. The cocoa butter recovered from press cake or from other cocoa products by the use of a solvent is contaminated by foreign matter of various kinds, probably including albumins, resins, coloring matter and ingredients which impart a disagreeable taste and odor to the fat. The albumins afford food for bacterial growth and thus promote the development of rancidity. Because of its characteristics crude cocoa butter obtained as a secondary product by the action of a solvent or otherwise has been of impaired value. It is distinguished from pure cocoa butter otherwise than as noted by a solidification point which is from 4 to 5° C. lower than that of the pure butter. This characteristic indicates the presence of impurities which retard crystallization of the fat.

One of the principal uses of cocoa butter is in the production of confectionery, and for this purpose it is desirable that the butter retain its characteristic chocolate flavor. The chocolatier demands, moreover, a cocoa butter of characteristic color because loss of color to him indicates a tendency to rancidity according to the usual standards.

It is the object of the present invention to provide a process of treating fats and oils, and particularly cocoa butter, for the purpose of removing objectionable odors and to otherwise convert it into a pure and wholesome edible product.

A further object of the invention is the selective separation of the impurities from cocoa butter without destroying the characteristic chocolate flavor and color of pressed butter.

I have discovered that these objects may be attained effectively and at slight expense by subjecting the impure fat to the action of a purifying agent having the property of selectively removing the impurities without materially affecting the desirable characteristic properties of the fat. Such an agent is carbon of high deodorizing power, but having a low capacity as a decolorizer. There are various carbons which may be used as purifying agents, but most of these are unsatisfactory, particularly the activated or highly active carbons which are customarily used in the decolorizing of sugar and like solutions. Willow and other carbons which are less active may be successfully used. Willow carbon made by carbonizing the wood of the willow is preferably used since it possesses to a high degree the exact properties which are necessary for the accomplishment of the desired result. This carbon is a very effective deodorizer when used in the treatment of cocoa butter, but it does not destroy the chocolate flavor. It moreover does not materially change the color of the butter.

Preferably in the application of the invention, the carbon is used in conjunction with purified infusorial earth. This latter material acts as a mat in the filter press to prevent the passage of the finally divided carbon through the filter medium. Equal proportions of willow carbon and infusorial earth are preferably employed to obtain the best results, but the proportions may be varied within comparatively wide limits depending upon the characteristics of the oil or fat treated. The proportion of the purifying agent used is likewise subject to variation, but in the treatment of ordinary material I have found that five per cent of carbon and five per cent of infusorial earth by weight of the oil or fat treated gives satisfactory results.

In carrying out the invention the oil or fat is placed in a suitable mixing kettle with the proper proportion of carbon and infusorial earth as indicated and is heated to 160° to 212° F. for a period of from one to two hours. The material is stirred to ensure proper dissemination of the purifying agents through the mass. At the conclusion of this treatment the melted oil or fat is filtered through a filter press to separate the solids and is allowed to solidfy.

Cocoa butter thus treated is found to have the color and chocolate taste and also a solidification point corresponding to that of pure cocoa butter. It is free from all objectionable odors present in the raw material and from albumins and resins. Cocoa butter purified according to this method may be preserved indefinitely under proper conditions without developing rancidity. It is, in fact, an edible product of the highest grade and is equivalent or superior to pressed butter.

By the practice of the invention it is possible to recover a materially larger proportion of high grade cocoa butter from cocoa beans than has been possible heretofore. The press cake may be extracted with a solvent and the butter thus produced may be purified and made suitable for use in foods and the like.

Various changes may be made in the details of application of the invention without departing therefrom or sacrificing any of the advantages hereinbefore set forth.

I claim:—

1. The step in the process of refining oils and fats, which comprises heating the oil or fat with willow carbon.

2. The step in the process of refining oils and fats, which comprises heating the oil or fat with willow carbon and infusorial earth.

3. The step in the process of the refining oils and fats, which comprises heating the oil or fat with willow carbon and infusorial earth at a temperature of approximately 160° to 212° F.

4. The step in the process of refining cocoa butter, which comprises heating the butter with approximately five per cent by weight of willow carbon.

5. The step in the process of refining cocoa butter, which comprises heating the butter with approximately five per cent by weight of willow carbon and five per cent by weight of infusorial earth.

6. The step in the process of refining cocoa butter, which comprises heating the butter with aproximately five per cent by weight of willow carbon and five per cent by weight of infusorial earth, and filtering the mixture to remove the willow carbon and infusorial earth.

In testimony whereof I affix my signature.

FRANK CURTIS GEPHART.